United States Patent
Chong et al.

(10) Patent No.: US 12,219,189 B2
(45) Date of Patent: *Feb. 4, 2025

(54) CDN OPTIMIZATION PLATFORM

(71) Applicant: MICROSOFT TECHNOLOGY LICENSING, LLC, Redmond, WA (US)

(72) Inventors: Frederick C. Chong, Kirkland, WA (US); Huaiye Zhang, Bothell, WA (US); Bin Zhou, Redmond, WA (US); Gang Xue, Beijing (CN); Xin Chen, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,106

(22) Filed: Nov. 7, 2023

(65) Prior Publication Data

US 2024/0179360 A1 May 30, 2024

Related U.S. Application Data

(63) Continuation of application No. 17/774,447, filed as application No. PCT/CN2019/115212 on Nov. 4, 2019, now Pat. No. 11,856,246.

(51) Int. Cl.
*H04N 21/24* (2011.01)
*G06N 7/01* (2023.01)
*H04N 21/2543* (2011.01)

(52) U.S. Cl.
CPC ........... *H04N 21/2402* (2013.01); *G06N 7/01* (2023.01); *H04N 21/2543* (2013.01)

(58) Field of Classification Search
CPC .. H04N 21/2402; H04N 21/2543; G06N 7/01; H04L 67/563; H04L 67/568; H04L 67/63; H04L 67/289
See application file for complete search history.

(56) References Cited

U.S. PATENT DOCUMENTS

| | | | |
|---|---|---|---|
| 9,787,745 B1 * | 10/2017 | Binns | H04L 65/611 |
| 10,311,372 B1 * | 6/2019 | Hotchkies | H04L 67/1097 |
| 11,055,454 B1 * | 7/2021 | Gasser | G06F 30/20 |

(Continued)

OTHER PUBLICATIONS

Communication pursuant to Article 94(3) EPC Received for European Application No. 19951824.2, mailed on May 7, 2024, 7 pages.

(Continued)

*Primary Examiner* — Jimmy H Tran
(74) *Attorney, Agent, or Firm* — Han Gim; Newport IP, LLC

(57) ABSTRACT

Techniques are disclosed for distributing data in a content delivery network configured to provide edge services using a plurality of service providers. Data indicative of data usage and cost data for the plurality of service providers is accessed. Based on the accessed data, an effective unit cost, multiplex efficiency, and channel utilization are determined for a selected user. A Bayesian optimization algorithm is applied to at least a portion of the accessed data. The content delivery network is configured to redistribute data traffic for the selected user based on a result of the applied Bayesian optimization algorithm.

20 Claims, 13 Drawing Sheets

(56) References Cited

U.S. PATENT DOCUMENTS

| | | | | |
|---|---|---|---|---|
| 11,176,489 | B1* | 11/2021 | Smola | G06N 3/04 |
| 11,226,885 | B1* | 1/2022 | Gasser | G06F 9/45533 |
| 11,593,704 | B1* | 2/2023 | Jenatton | G06F 16/958 |
| 2011/0078230 | A1* | 3/2011 | Sepulveda | H04L 67/1074 709/224 |
| 2011/0137973 | A1* | 6/2011 | Wei | H04L 67/1001 709/202 |
| 2012/0259997 | A1* | 10/2012 | Liskov | H04L 67/63 709/238 |
| 2013/0111038 | A1* | 5/2013 | Girard | H04L 69/16 709/226 |
| 2014/0122725 | A1* | 5/2014 | Batrouni | H04L 67/568 709/226 |
| 2014/0188974 | A1* | 7/2014 | Ioannidis | H04L 67/568 709/202 |
| 2014/0359092 | A1* | 12/2014 | Middleton | G06F 16/2471 709/221 |
| 2014/0362761 | A1* | 12/2014 | Dankberg | H04B 7/18595 370/312 |
| 2015/0012593 | A1* | 1/2015 | Phillips | H04L 41/0893 709/204 |
| 2015/0382088 | A1* | 12/2015 | Braun | H04J 14/02 398/61 |
| 2017/0195237 | A1* | 7/2017 | Parasmal | H04L 43/0876 |
| 2017/0302982 | A1* | 10/2017 | Simpson | H04N 21/2407 |
| 2017/0366595 | A1* | 12/2017 | Feher | H04N 21/2402 |
| 2018/0278571 | A1* | 9/2018 | Gal | H04L 61/4511 |
| 2019/0138362 | A1* | 5/2019 | Ganapathi | H04L 67/566 |
| 2019/0141113 | A1* | 5/2019 | Ganapathi | G06N 7/01 |
| 2019/0141542 | A1* | 5/2019 | Ganapathi | H04L 41/14 |
| 2019/0164080 | A1* | 5/2019 | Stefani | G06F 9/45558 |
| 2019/0215361 | A1* | 7/2019 | Lohmar | H04L 67/10 |
| 2019/0222491 | A1* | 7/2019 | Tomkins | H04L 41/0823 |
| 2019/0222619 | A1* | 7/2019 | Shribman | H04L 65/65 |
| 2019/0253274 | A1* | 8/2019 | Van Dussen | H04L 12/4641 |
| 2019/0261200 | A1* | 8/2019 | Ganapathi | H04L 41/0894 |
| 2019/0342770 | A1* | 11/2019 | Ganapathi | H04L 69/16 |
| 2019/0356498 | A1* | 11/2019 | Hernandez Sanchez | H04M 15/00 |
| 2019/0387055 | A1* | 12/2019 | Varvello | H04L 41/142 |
| 2020/0015121 | A1* | 1/2020 | Misra | H04L 65/752 |
| 2020/0021490 | A1* | 1/2020 | Schrimpsher | H04L 41/046 |
| 2020/0128065 | A1* | 4/2020 | Ganapathi | G06N 5/01 |
| 2021/0117322 | A1* | 4/2021 | Baughman | H04L 67/61 |
| 2021/0152866 | A1* | 5/2021 | El Essaili | H04N 21/4884 |
| 2022/0188700 | A1* | 6/2022 | Khavronin | G06Q 30/0201 |
| 2022/0197773 | A1* | 6/2022 | Butler | G06F 9/505 |
| 2022/0224990 | A1* | 7/2022 | Kimura | H04N 17/004 |
| 2022/0303331 | A1* | 9/2022 | Svennebring | H04N 21/44209 |

OTHER PUBLICATIONS

Zhang, et al., "Geo-Edge: Geographical resource allocation on edge caches for video-on-demand streaming", In 2018 4th International Conference on Big Data Computing and Communications (BIGCOM), Aug. 7, 2018, pp. 189-194.

* cited by examiner

Traffic Adjustment Simulation

Scenario Info

| | |
|---|---|
| Scenario Name | Scenario 1 |
| Month | Nov-2018 |
| Customer Type | Existing Customer |
| Customer Name | Dxxanu |
| Subscription | f46465sggg4546h5657 |

Customer Billing Info

| | |
|---|---|
| Billing Type | Average |
| Unit Price | 12.5 |

Pipe Distribution Adjustment

| Provider | Provider Pipes | Unit Price | Proportion | Operation |
|---|---|---|---|---|
| Bing1 | Bing1-Average-8 | 8 | 30 % | + - |
| Oxxy | Oxxyy-Average | 8.3 | 20 % | + - |
| CCCB | Tenpt- | 0.054 | 50 % | + - |

RMB Save Run

Simulation Result

Month: 2018-09   Select scenarios: OPPO-201807 ▼   Original× Scenario1× Scenario2×

Financial Impact

Overall CDN Financial Status

| Overall CDN Financial Status | Actual | Scenario 1 |
|---|---|---|
| Margin | 9% | 19% |
| Cost | 3,000,000 | 2,900,000 |

Top Customer Financial Status

| Top Customers | Actual | | Scenario 1 | |
|---|---|---|---|---|
| | Total Cost | Margin | Total Cost | Margin |
| Damien Simonds | 3,000,000 | 15% | 2,700,000 | 17% |
| Marc Ganz | 3,000,000 | -6% | 3,100,000 | 20% |
| Joshua Doster | 3,000,000 | 15% | 2,700,000 | 18% |
| Chad Vanduyne | 3,000,000 | 15% | 3,100,000 | 12% |
| Jill Sera | 3,000,000 | 15% | 2,700,000 | 15% |
| Russ Deford | 3,000,000 | 15% | 3,100,000 | 12% |
| Loralee Schorr | 3,000,000 | 15% | 2,700,000 | 17% |
| Adriene Dawley | 3,000,000 | 15% | 3,100,000 | 12% |
| Andy Moak | 3,000,000 | 15% | 2,700,000 | 17% |
| Sheila Kesten | 3,000,000 | 15% | 3,100,000 | 22% |
| New customer name | 3,000,000 | 15% | 2,700,000 | 17% |

FIG. 4

CDN OPTIMIZATION PLATFORM

CROSS REFERENCE OF RELATED APPLICATIONS

The present application is a continuation of U.S. patent application Ser. No. 17/774,447, filed May 4, 2022, which claims priority to 371 of international Application PCT/CN2019/115212, filed Nov. 4, 2019. The contents of the application are incorporated herein by reference in its entirety.

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines (VM) that appear and operate as independent computer devices to a connected user. The data center can create, maintain or delete virtual machines in a dynamic manner.

A content delivery network (CDN) refers to a geographically distributed group of servers and other devices that work together to provide efficient delivery of content to end-users of data center services, with the goal being to serve content with high availability and high performance.

It is with respect to these considerations and others that the disclosure made herein is presented.

SUMMARY

Some CDN services use a fusion or hybrid model to dynamically route traffic among multiple providers. In a hybrid model, the end-users may not have visibility to the underlying CDN providers. Instead, the CDN providers may be managed as a collective resource pool and user traffic may be dynamically routed to one or more CDN providers simultaneously based on the service provider's performance, capacity, cost, and availability. It can be difficult for the data center to efficiently distribute user data traffic among the various providers to minimize cost.

Embodiments are disclosed for optimizing traffic distribution in a fusion or hybrid CDN model. Techniques are disclosed for measuring performance in a fusion or hybrid CDN network so that traffic distribution and cost can be optimized. Selection and organization/presentation of metrics can enable assessment and real time optimization.

The disclosed techniques may allow for improved service costs and a reduction in time and effort to distribute user traffic. A traffic management platform may be implemented so that user traffic can be distributed across multiple supplier channels. Distribution decisions can be made in a timely fashion according to quality of service, peak time windows, and/or capacity constraints.

In one embodiment, a Bayesian simulation framework may be implemented for optimizing the traffic distribution to improve traffic shaping plans and cost. In an embodiment, a tailored Metropolis-Hastings algorithm may be implemented for tuning the CDN fusion engine. The disclosed embodiments may be used to predict efficient ways to distribute data traffic, while continuously improving the predictions based on current data.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 4 is a diagram illustrating an example data chart in accordance with the present disclosure;

DETAILED DESCRIPTION

Traffic optimization techniques are typically limited to theoretical analysis and can be difficult to implement effectively in operational networks. This can be exacerbated in a fusion or hybrid CDN environment where multiple service providers are managed as a collective resource pool and where user traffic can be dynamically routed to one or more of the CDN providers. In various embodiments, the disclosure describes a data and analysis platform that may include a machine learning algorithm and a smart routing engine for optimizing data traffic in a fusion or hybrid CDN framework. The data and analysis platform may integrate a plurality of data sources for collecting and feeding network traffic data between users and the data platform. A user interface may be provided to report results as pertaining to cost and performance. The user interface may provide data that enable service providers to validate the traffic distribution plan proposed by the disclosed algorithm. The validated traffic shaping plan may be programmed into an intelligent routing engine for operational implementation.

In a Content Distribution Network (CDN), a parallel high-performance network may be implemented using a network of highly distributed servers. By being dispersed over many physical and network locations, but optimized as one network, more control and reliability may be provided for user requests. CDNs typically function at the edge in terms of localized storage (caching popular content in areas where it will very likely be consumed in order to improve quality of experience). CDNs may also deliver localized computer cycles, and place computing resources in proximity to the end users.

Figure 1A:
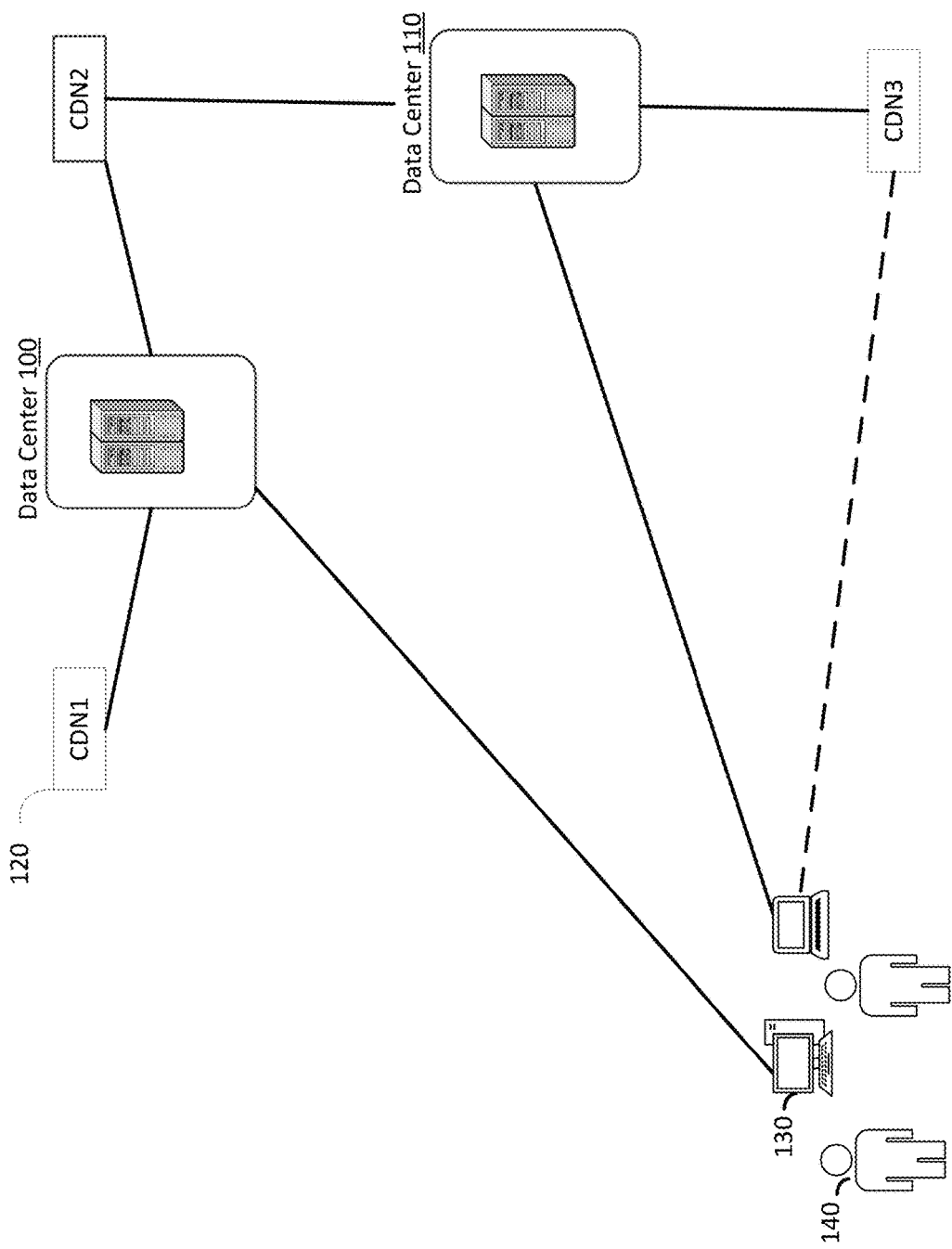
FIG. 1A is a diagram illustrating an example architecture in accordance with the present disclosure.

FIG. 1A illustrates one example where users of a data center may be serviced by multiple CDN providers. FIG. 1A illustrates data center 100 and 110 that are configured to provide computing resources to users 140 via user computers 130. The computing resources provided by data centers 100 and 110 may be cached or replicated at edge notes 120. The computing resources provided by the data centers 100 and 110 and edge nodes 120 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein.

It should be appreciated that the network topology illustrated in FIG. 1A has been greatly simplified and that many more networks and networking devices may be utilized to interconnect the various computing systems disclosed herein. These network topologies and devices should be apparent to those skilled in the art.

As illustrated, geographic areas may provide multiple CDN providers, and a cloud service provider may act as an aggregator of third-party CDN providers under the constraint of limited network infrastructure coverage. As a resource aggregator, improving the use of sources and reducing operating costs may be a challenge. One solution is to define metrics for business management and use machine learning to improve cost and performance. Unique challenges may need to be addressed when a fusion model is implemented to dynamically route traffic among multiple providers. Under a fusion model, the CDN providers are managed as a collective resource pool and customer traffic is dynamically routed to one or more CDN providers simultaneously based on provider's performance, capacity, cost and availability.

Embodiments are further disclosed for implementing an intelligent routing engine based on machine learning algorithms. An optimization engine may be implemented to enable optimization of costs by distributing traffic to multiple supplier channels and time windows, taking into account the quality of service and availability of channels.

For example, Table 1 below describes three unique traffic distribution channels from different providers with different billing models:

| Traffic Distribution Channel | Provider Name | Billing Model | Unit Cost |
|---|---|---|---|
| Channel 1 | Provider A | Monthly 95-5 Peak Bandwidth | $1.09 per Mbps |
| Channel 2 | Provider B | Average Peak Bandwidth | $1.23 per Mbps |
| Channel 3 | Provider C | Total Volume | $0.0077 per GB |

In some implementations, services may have at least two different charge types: Total Volume and Bandwidth Billing which has three variants: Average Peak Bandwidth, Monthly 95-5 Peak Bandwidth and Daily 95-5 Monthly Average.

1. Total Volume (GB): customer is charged for the total amount of traffic volume (in GB) over the period of one month.
2. Average Peak Bandwidth: The rate of data transfer for the billing month is metered at every 5 minute interval. The highest data transfer for each day is added and divided by the total number of effective days within the month to derive the average peak data transfer rate used for billing.
3. Monthly 95-5 Peak Bandwidth: The rate of data transfer (Mbps) for the billing month is metered at every 5 minute interval and sorted in descending order. The top $5^{th}$ percentile of the sorted data transfer rates is removed, and the next metered data transfer rate is used for billing. The top $5^{th}$ percentile equals 36 hours of bandwidth peaks. If the peak does not exceed 36 hours, customer doesn't have to pay for the spikes.
4. Daily 95-5 Monthly Average: The rate of data transfer for the billing month is metered at every 5 minutes interval. The top $5^{th}$ percentile of the sorted daily data transfer rates are removed, and the next metered data transfer rate is used for billing for the day. Each day is added and divided by the total number of effective days within the month to derive at the average peak data transfer rate used for billing.

In an embodiment, a fusion engine may be configured to manage CDN traffic intelligently based on the capacity, reliability, performance and cost of each CDN network. Two features may include load balancing and cost savings. Some CDN users may generate a large surge of traffic volume within a short time. One example of this is when a major mobile phone manufacturer updates its firmware. In many cases, the traffic pattern is unpredictable and volatile. In such scenarios, smart routing can distribute the traffic proportionally among multiple providers by factoring in their respective available capacities to avoid congestion or service failures.

Figure 1B:
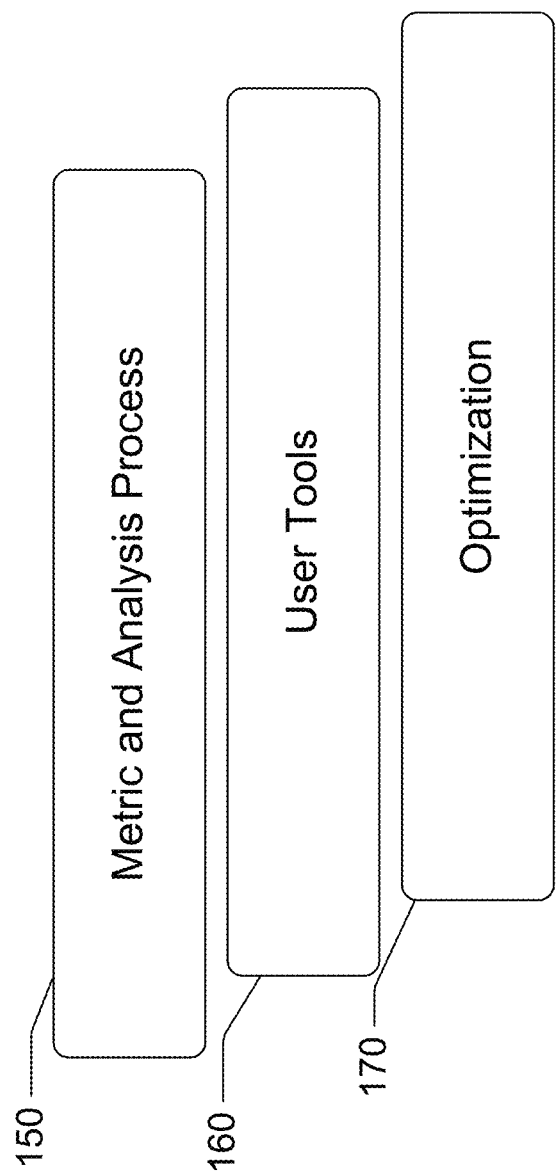
FIG. 1B is a diagram illustrating example functions that enable various embodiments in accordance with the present disclosure.

FIG. 1B illustrates an example set of processes that may be implemented to address the shortcomings noted above. A metric and analysis process 150 may be implemented that defines and selects various metrics that may be used to determine the performance of a fusion or hybrid CDN network. User tools 160 such as user interfaces may be provided that enable administrators and other users to view and filter the metrics, as well as perform various what-if scenarios for distributing network traffic. An optimization engine 170 may be implemented that optimizes the distribution of traffic based on one or more parameters.

Figure 2:
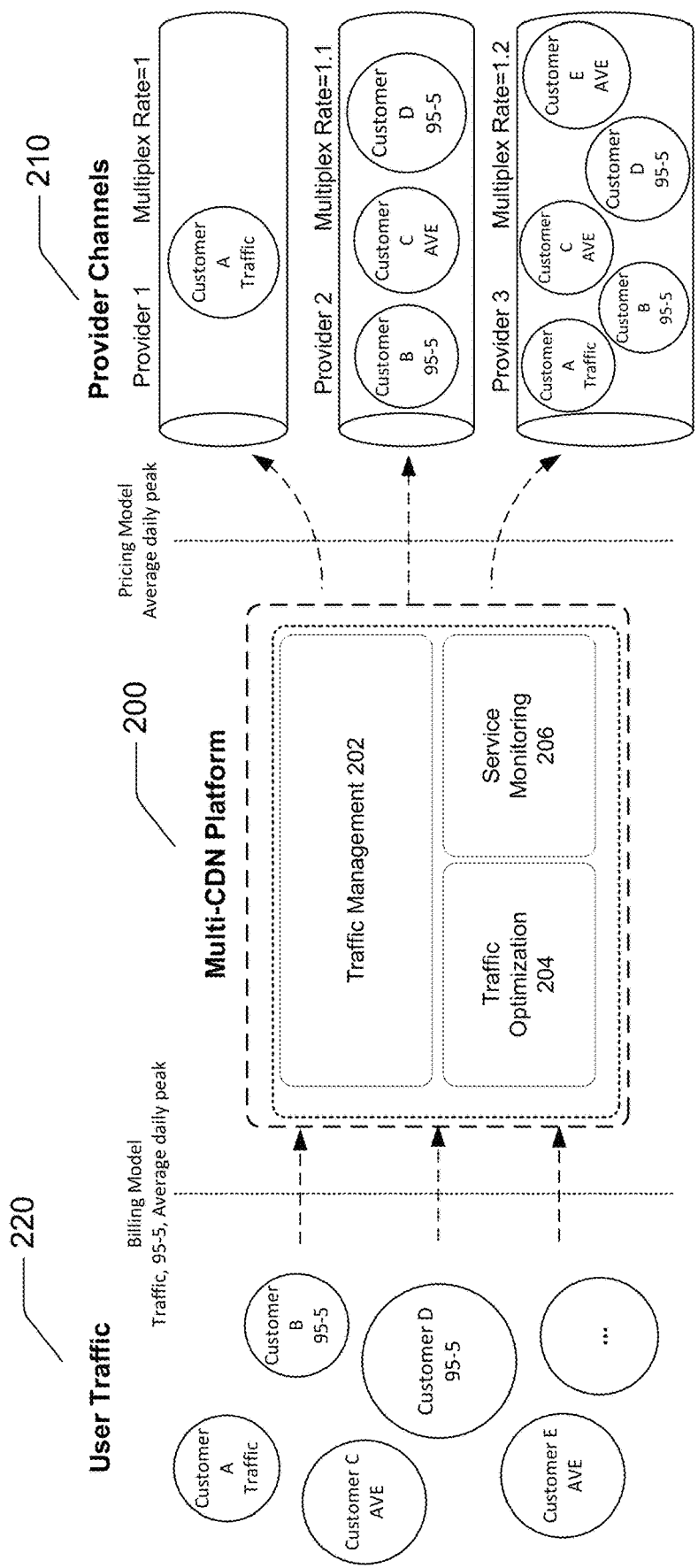
FIG. 2 is a diagram illustrating an example architecture in accordance with the present disclosure.

If multiple providers are available to meet performance requirements, the fusion engine can select one or more channels to distribute traffic as a result of which the total cost is minimized. FIG. 2 illustrates an example of a multi-CDN platform 200 where customer traffic 220 may be distributed to multiple CDN provider channels 210. In an embodiment, the multi-CDN platform 200 may include a traffic management component 202, traffic optimization component 204, and service monitoring component 206 which will be further detailed below.

Figure 3:
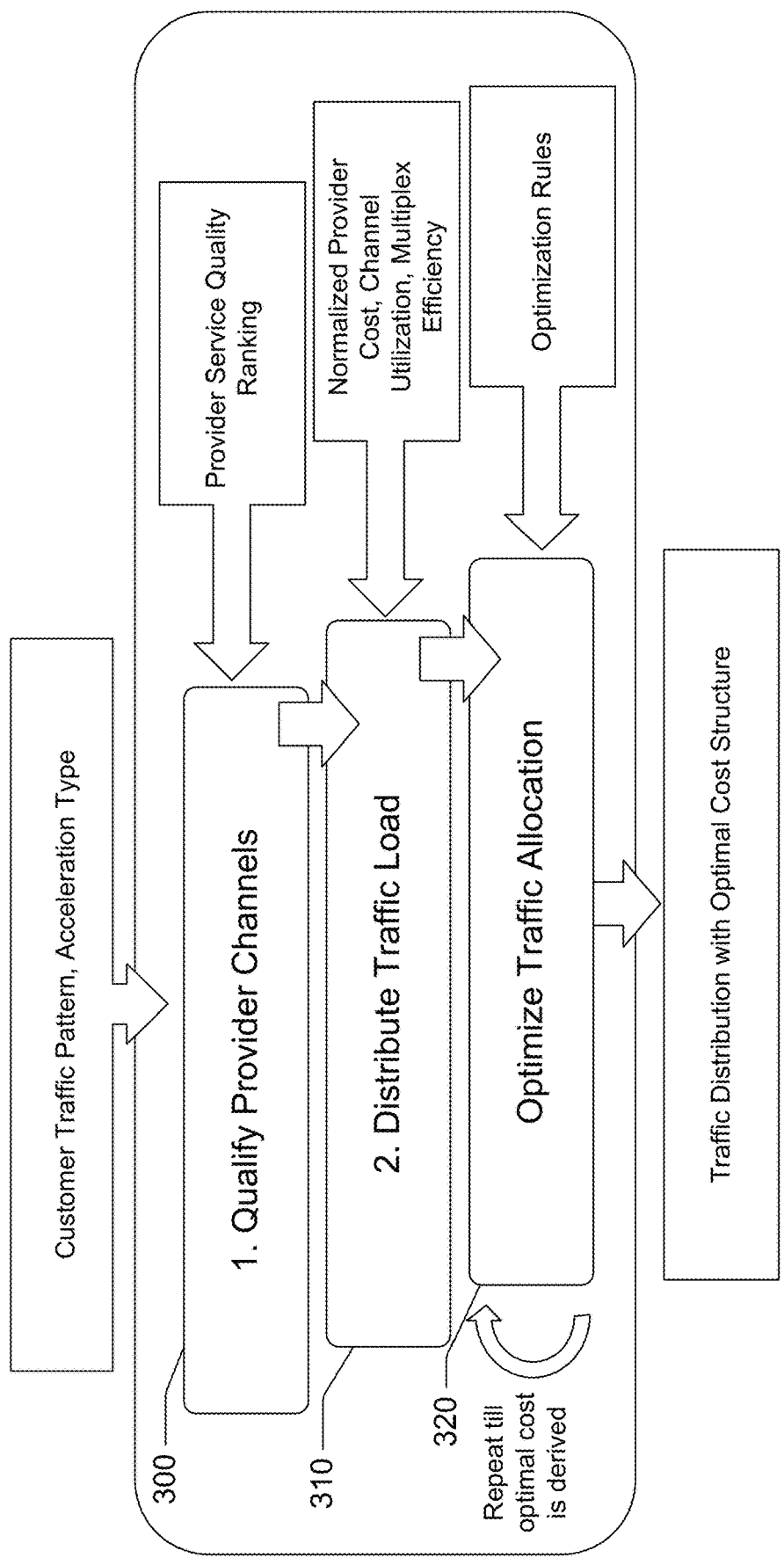
FIG. 3 is a diagram illustrating an example flow diagram in accordance with the present disclosure.

FIG. 3 illustrates an example functional flow for optimally distributing traffic. The functional flow may, for example, be implemented in one or more components illustrated in FIG. 2. The functional flow may include one or more processes to qualify provider channels 300. This process may receive as input customer traffic pattern data and acceleration type data. Furthermore, input may be provided that is indicative of service quality rankings for the service providers. The functional flow may further include one or more processes to distribute traffic loads 310. This process may receive as input the outputs from qualify provider channels 300 as well as data indicative of normalized provider cost, channel utilization, and multiplex efficiency. The functional flow may further include one or more processes to optimize traffic allocation 320. This process may receive as input the outputs from distribute traffic load 310 as well as optimization rules, and output a proposed traffic distribution with an optimal cost structure.

In an embodiment, three metrics may be implemented: effective unit costs, multiplexing efficiency, and channel utilization.

Effective Unit Cost. Customer traffic may be allocated to the distribution channels of the provider. Each distribution channel, as mentioned above, may have a defined billing model and unit contract cost. However, the unit contract cost is typically designed for billing purposes, but may not be a practical measure for channel management. First, the unit contract cost is not a unified measurement. When the billing model is a total volume, unit contract costs are dollars per GB, while the billing model is an average peak bandwidth, e.g., in dollars per Mbps. There is no easy conversion factor for different billing models to compare contract costs.

Second, even the same peak bandwidth billing for customers can be interpreted differently. Some customers may use the bandwidth completely and move more GB traffic per Mbps, while others may use less. A unified cost measurement can therefore be defined. In an embodiment, a term may be defined that meets the needs of two aspects. 1) ability to measure costs consistently across billing types; 2) the measurement reflects the actual cost to the customer and the benefit to the acquisition and pricing strategy of customers.

In an embodiment, the effective unit cost may be defined as follows:
Effective Unit Cost ($/GB)=Total Cost ($)/Total Traffic (GB); For peak average bandwidth billing, Total Cost ($)=Billed Bandwidth(Mbps)*Billing Rate($/Mbps)

Effective unit cost is the unit contract cost (dollars per GB) for the Total Volume billing model. Together with two other metrics, defined herein, customer traffic patterns may affect the effective unit cost.

Traffic Multiplexing. Traffic multiplexing combines traffic from two or more customers into a single traffic distribution channel. Multiplex efficiency measures the ability to combine customer traffic to maximize bandwidth utilization of provider traffic channels, thus resulting in overall cost-efficiency. In some cases, it is possible to aggregate customer traffic with varying peak time traffic into the same instance of traffic channel.

Multiplex Efficiency is calculated by taking the total bandwidth requirement if each customer's traffic uses separate instances of traffic channel divided by the combined total bandwidth requirement if the customer's traffic is combined and share a single instance of traffic channel. In one example illustrated below, efficiency is 250/220=1.136.

| Customer Name | Average Bandwidth |
| --- | --- |
| Douyu | 100 Gbps |
| OPPO | 50 Gbps |
| VIVO | 100 Gbps |
| Multiplexed Bandwidth | 220 Gbps |
| Sum of Bandwidth | 250 Gbps |
| Multiplex Efficiency | 250/220 = 1.136 |

To maximize multiplexing efficiency, all customers may be merged into one channel. Constraints on provider capacity, availability and quality of service and partnership are factors to be taken into account in actual operation.

Channel Utilization. Bandwidth utilization may be calculated by taking the actual total traffic incurred in a month, divided by the total traffic volume paid to the underlying provider and available to use.

Traffic Shaping is defined as a process for the distribution of customer traffic to two or more channels of providers. There are two basic strategies for traffic shaping. Both may lead to a reduction of the total customer's cost and effective unit cost.

In one embodiment a Bayesian optimization algorithm can be applied to traffic shaping problems.

A total cost function $C(\theta)$ can be written as:

$$C(\theta) = C_{ch_1} + C_{ch_2}$$

where $$C_{ch_1} = \alpha \times \Sigma_i \{\max_i[(\min(\theta, T_{ij})]\} \times 1000/(d*37.5)$$

and $$C_{ch_2} = b \times \Sigma_{ij} \{\max(T_{ij} - \theta, 0)\}$$

$C_{ch_1}$ and $C_{ch_2}$ represent the cost for Channel 1 and 2 respectively. i=1 . . . d, where d is number of days in a month. j is the number of traffic data within a day, j=1 . . . n, with 5 minute granularity traffic data, thus n=288. $T_{ij}$ is cumulative traffic GB at day $i^{th}$ and data point $j^{th}$. $C_{ch_1}$ is the unit cost multiplied by billed bandwidth converted from the traffic value, and $C_{ch_2}$ is unit cost multiplied by total volume after traffic shaping.

The Billed Average Peak Bandwidth can be converted from the maximum daily peak 5 minute cumulative traffic. It is the 7-day average of the daily traffic peak (GB) multiplied by 1000 and divided by 37.5.

Table 3 illustrates a comparison of key metrics between Channel 1 only and a traffic shaping plan with θ=600 GB. The traffic shaping plan may be programmed into a smart routing engine where any traffic over 600 GB is redirected to Channel 2. The cost savings of the traffic shaping plan may be calculated as 20% compared to the Channel 1 only plan shown in Table 3. The traffic shaping plan with improved channel efficiency metrics shows that Channel 2 utilization improved from 21% to 69%, and the effective unit cost for Channel 1 was reduced to $0.0057/GB. The optimal cost savings may be determined as a result of balancing improving utilization of one channel and shaping partial traffic to a channel with high cost. In this case, the effective unit cost of Channel 2 is $0.009/GB.

| | Comparing Channel 1 Only and Traffic Shaping Plan with Threshold = 600 GB | | | |
|---|---|---|---|---|
| Plan | Metrics | Channel 1 | Channel 2 | Total |
| Shaping Plan | Traffic(GB) | 789,375 | 276,068 | 1,065,443 |
| | Cost($) | $4,529 | $2,484 | $7,013 |
| | Effective Unit Cost ($/GB) | $0.0057 | $0.0090 | $0.0066 |
| | Channel Utilization (%) | 69% | — | — |
| Channel 1 | Traffic(GB) | 1,065,443 | — | 1,065,443 |
| | Cost($) | $8,819 | — | $8,819 |
| | Effective Unit Cost ($/GB) | $0.0083 | — | $0.0083 |
| | Channel Utilization (%) | 48% | — | 48% |

For computational convenience, the optimization objective function may be formed by $f(\theta)$. $\theta$ is one parameter of a set of parameters which describe an underlying physical setting in such a way that their value affects the distribution of the measured value f. The task of the optimization is to find a set of $\theta$ to maximize gross margin, where f=R−C, where total revenue R here is a constant and total cost C is a function which was previously defined.

Optimization algorithms minimize or maximize an objective function $f(\theta)$ which is a mathematical function depending on the model's internal parameters $\theta$ along with other input data which are taken as consistent values in the algorithm. Two types of widely used optimization algorithms are numerical algorithms and derivative-free algorithms.

Numerical optimizing algorithms have some variants: first order optimization, second order optimization, and iterative optimization algorithms.

1. First order optimization algorithms minimize or maximize a loss function $f(\theta)$ using its gradient values with respect to the parameters. The gradient is a multi-variable generalization of the derivative. It can be explained as a slope on a multi-dimension surface. A widely used first order optimization algorithm is gradient descent which is an optimization algorithm used that can be used in optimizing neural networks. Gradient descent may be used to update weights in a neural network model.

2. Second order optimization algorithms. Second-order methods use the second order derivative—which is also called the Hessian—to minimize or maximize the loss function. The Hessian is a matrix of second order partial derivatives. The second order derivative not only informs the direction of convergence, but also hints at the function's curvature which can facilitate the speed of convergence. One disadvantage is the computational cost of computing the second derivative.

3. Iterative methods may be used to solve nonlinear programming problems where Hessians (H) and gradients (G) are difficult to calculate. Approximating the gradient takes at least N+1 function evaluations. Newton's method is a popular approximation of second-order derivatives (collected in the Hessian matrix) where the number of function evaluations is in the order of $N^2$. However, the gradient optimizer typically needs more iterations than provided by Newton's algorithm.

Most mathematical programming methods rely on the presence of an algebraic model. The availability of an algebraic model has many obvious implications to a mathematical programming expert, including the ability to evaluate a function quickly, the availability of derivative information, and the possibility of formulating a dual problem.

Derivative-free algorithms is an umbrella for techniques used for stochastic simulations. Simulation optimization involves the search for those specific settings of the input parameters to optimize a target objective. As opposed to mathematical programming, simulation optimization does not assume that an algebraic description of the function is available. The description may be available as a black-box that only allows the evaluation of the objective and constraints for a particular input. In fact, many simulation optimization algorithmic approaches solely depend on such input-output data from the simulation in their search for optimal input settings.

When an algebraic description of the simulation is not accessible, derivative information is usually unavailable, and the estimation of derivatives from the use of finite differences may not be suitable due to noisy outputs and the expensive nature of simulations. Several popular approaches are available for the black-box function, such as: genetic algorithms, simulated annealing, Tabu search, and Bayesian optimization. Genetic algorithms may not be flexible and it is a pure random search which may not have sufficient efficiency. Simulated annealing uses a probabilistic method that is derived from the annealing process in which the material is slowly cooled so that, while its structure freezes, it reaches a minimum energy state. As a global optimal algorithm, simulated annealing consumes a significant amount of computation time to converge and the cooling speed setup may be difficult. Tabu search takes a potential solution to a problem and checks its immediate neighbors. It may provide good performance with prior knowledge of the parameter space.

In comparison with the solutions mentioned above, Bayesian optimization may be motivated by several aspects: 1) gross margin function f is not differentiable, 2) the algorithm is easy to set up and apply to different business scenarios, 3) with the right setup, a Bayesian algorithm can converge to optimal within a reasonable computing time. Bayesian optimization specifies a probabilistic prior distribution over the function f and applies Bayesian inference to compute a posterior distribution of $\theta$ given the current parameter sets $\theta_t$. This posterior distribution is used in turn to construct a proposal function for determining the next point$_{\theta t+1}$. Details of the Bayesian approach is discussed as follows:

Markov chain Monte Carlo (MCMC) is a computer-driven sampling method. It allows one to characterize a distribution without knowing all of the distribution's mathematical properties by randomly sampling values out of the distribution. A particular strength of MCMC is that it can be used to draw samples from distributions even when all that is known about the distribution is how to calculate the density for different samples. The name MCMC combines two properties: Monte-Carlo and Markov chain. 1) Monte-Carlo is the practice of estimating the properties of a distribution by examining random samples from the distribution. For example, instead of finding the mean of a normal distribution by directly calculating it from the distribution's equations, a Monte-Carlo approach would be to draw a large number of random samples from a normal distribution and calculate their sample mean. The benefit of the Monte-Carlo approach is that calculating the mean of a large sample of numbers can be much easier than calculating the mean directly from the normal distribution's equations. 2) The Markov chain property of MCMC is the idea that the random samples are generated by a special sequential process. Each random sample is used as a stepping stone to generate the next random sample. A special property of the chain is that, while each new sample depends on the one before it, new samples do not depend on any samples before the previous one (this is the "Markov Chain" property).

MCMC is particularly useful in Bayesian inference because of the focus on posterior distributions which are often difficult to work with via analytic examination. In such cases, MCMC allows the user to approximate aspects of posterior distributions that cannot be directly calculated (e.g., random samples from the posterior, posterior means, etc.). Bayesian inference uses the information provided by observed data about a set of parameters, formally the likelihood, to update a prior state of beliefs parameters to become a posterior state of beliefs. The Metropolis-Hastings algorithm is one popular variant of MCMC methods.

Random-Walk Metropolis Algorithm. In Bayesian black-box optimization, it assumes that the function value is observed with an unknown noise magnitude. Empirically it can be assumed that the observation noise is normally distributed. The Metropolis-Hastings algorithm (MH) generates a candidate $\theta$ from proposal distribution $g(\theta|\theta_t)$. Note that samples from the proposal distribution are not accepted automatically as posterior samples. Samples are accepted with the acceptance probability $\alpha$. There are mainly two kinds of proposal distributions, symmetric and asymmetric. A proposal distribution is a symmetric distribution if $g(\theta|\theta_t)=g(\theta_t|\theta)$. Straightforward choices of symmetric proposals include Gaussian distributions or uniform distributions centered at the current state of the chain. For example, if we have a Gaussian proposal, then the sampling is $\theta_t\sim$Normal$(\theta_{t-1}, \sigma)$. The probability density function (pdf) is expressed as Normal$(\theta_t; \theta_{t-1}, \sigma)$. It is simple to prove Normal$(\theta_{t-1}; \theta_t, \sigma)$=Normal$(\theta_t; O_{t-1}, \sigma)$. This is a symmetric proposal. Acceptance rate $\alpha$ in Algorithm 1 will be $$\alpha = \frac{f(\theta^*)}{f(\theta_t)}.$$

This proposal distribution randomly perturbs the current state of the chain, and then either accepts or rejects the perturbed value. Algorithms of this form may be called "Random-walk Metropolis algorithm."

---

Algorithm 1 Metropolis-Hastings algorithm framework to tune CDN fusion engine

1: procedure CONSTRUCT MARKOV CHAIN $\theta$ WITH STATIONARY DISTRIBUTION $f(\theta)$
2: Set up a baseline $\theta_0$.
3: For t in $\theta$ to T, do
4: Generate next paramter, $\theta_{t+1}$, in three steps within a loop:
5: loop:
6: 1) Proposal a sample candidate $\theta^*$ from proposal distribution $g(\theta|\theta_t)$.

7: 2) Calculate the acceptance ratio $\alpha = \frac{f(\theta^*)\{g(\theta_t|\theta^*)\}}{f(\theta_t)\{g(\theta^*|\theta_t)\}}$ to evaluate, 8: 3) Accpet or Reject:
9: Generate uniform random number u on [0, 1].
10: if u < $\alpha$ then
11: $\theta_{t+1} \leftarrow \theta^*$.
12: t ← t + 1.
13: goto loop.
14: close;
15: Save $\theta_t$ and $f(\theta_t)$.
16: end For

---

Random-walk MH algorithms are one type of an MH algorithm. This sampling method is useful to draw samples from a full conditional distribution since the integration of the target function f is not needed. In practice, this algorithm involves an evaluation step and a potential rejection rate after a sample is drawn from g. Note: $\theta$ is the only setting in such a way that their value affects the measured value, f, given other factors fixed. Without investigating details of numerical characteristics of this function, it can be taken as a black-box, feeding a $\theta$ and spinning out a f value. As described, the initial $\theta_0$=100 GB doesn't impact the convergence. Samples from the proposal distribution can be expressed as: $\theta\sim N(\theta; \theta_0, \sigma)$. We set up $\sigma$=100 and initial $\theta_0$=100 GB. $\theta^*$ is sampled from $\theta\sim N(\theta; \theta_0, \sigma)$. $\theta^*$ will be accepted with the probability of calculated a and then assign $\theta_1=\theta^*$. In the next iteration, $\theta^*$ is sampled from $\theta\sim N(\theta; \theta_1, \sigma)$, update a accordingly, and decide accept or reject $\theta_1$, or it can be generalized to $\theta_t$ assuming t=0 . . . T, where T is total number of iterations. Proposal distribution is a Gaussian distribution, $N(\mu, \sigma)$.

Adoptive Rejection Sampling (ARS). When the problem has multiple unknown parameters, random-walk algorithm might not be efficient enough to generate an optimal solution. We can choose to work with asymmetric proposal distributions in certain cases. A proposal distribution g may be built which is dependent on the objective function f to ensure that candidate $\theta$ has a reasonable acceptance rate.

The Adoptive Rejection Sampling (ARS) is proposed to use a sequence of sampling distributions $g_m(\theta)$ defined by a piecewise linear function $h_m(\theta)$:

$h_m(\theta)$=Min$\{L_{i-1,i}(\theta;S_m), L_{i+1,i+2}(\theta;S_m)\}$, and
$\theta_i\leq\theta\leq\theta_{i+1}$ Where $S_m=\{\theta_i, l=0, \ldots, m+1\}$ is a set of points in the support of f. $L_{ij}(\theta, S_m)$ denotes the straight line through points $[\theta_1, \ln(f(\theta_1))]$ and $[\theta_j, \ln(f(\theta_j))]$. Define $M_m=\int \exp(h_m(\theta))d\theta$, The proposal distribution is given by:

$$g_m(\theta) = \frac{\exp(h_m(\theta))}{M_m}$$

To avoid mathematical expressions, ARS constructs an envelope function on top of objective function f. It uses this envelope function $g_m$ as the proposal function g. When m is sufficiently large, $g_m$ is an approximation of f. It can be observed that this $g_m(\theta t+1)$ function does not depend on $\theta_t$. Therefore, the acceptance rate in Algorithm 1 can be changed to:

$$\alpha = \frac{f(\theta^*)g_m(\theta)}{f(\theta_t)g_m(\theta^*)}$$

Since θ is proposed from an approximation of the target function f the ARS method has an acceptable acceptance rate. The growth of computation power makes the effort to construct the envelope function $g_m$ reasonable to compute. The other benefit is that this algorithm is a parallel ready algorithm since it is not sequence algorithm depending on previous θ. In step 1 of Algorithm 1, multiple candidates can be proposed simultaneously and the candidate with the highest f(θ) value may be sent to evaluate for step 2. In this way, the number of treads may be determined to reduce the computation time to convergence to satisfy the needs for the system design.

FIG. 4 illustrates an example user interface 400 that may be implemented to enable user and administrators to view and filter metrics for a fusion or hybrid CDN management platform. In addition to viewing metrics for analysis, the user interface 400 may enable execution of various what-if scenarios for distributing network traffic.

Figure 5:
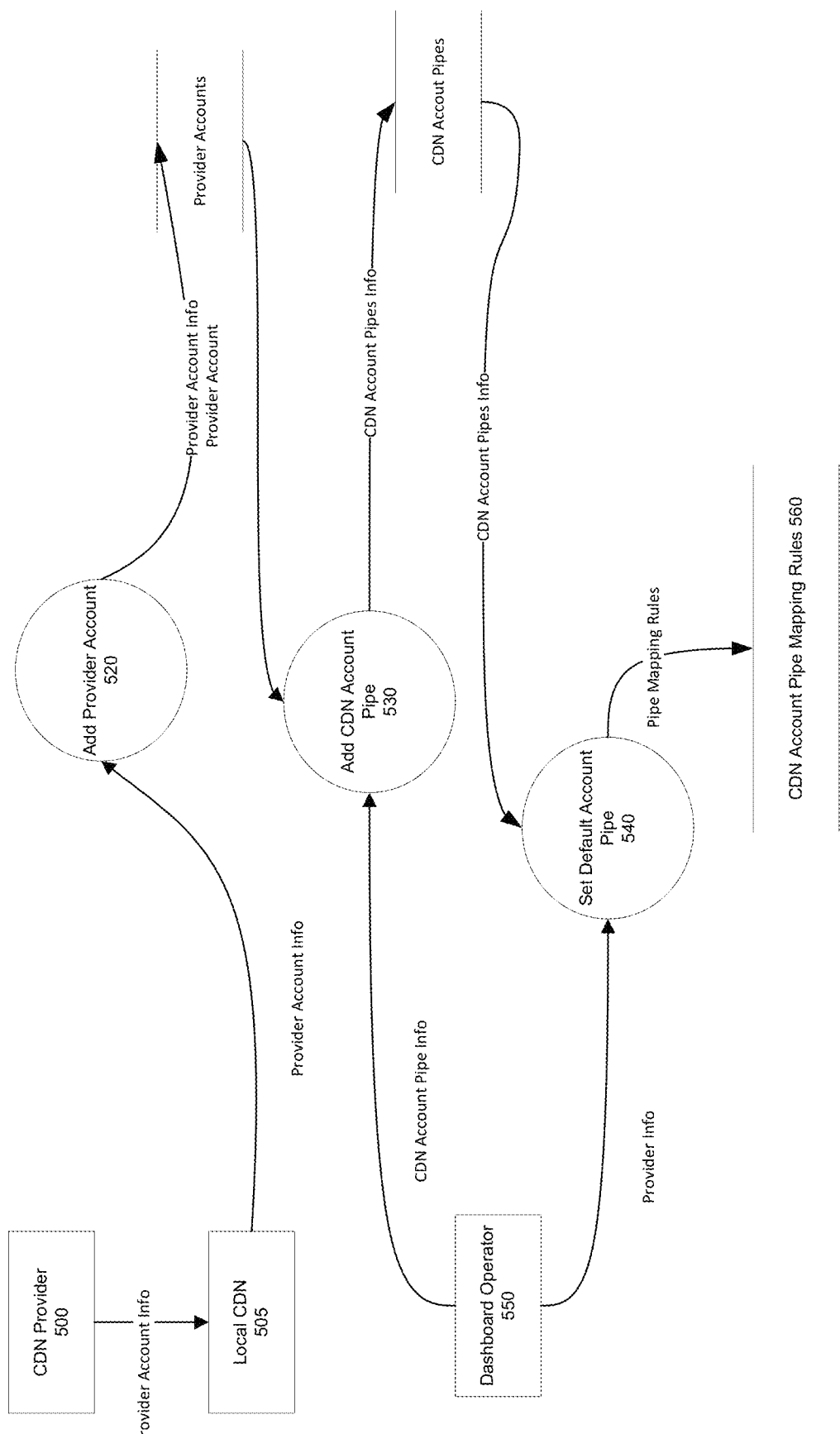
FIG. 5 is a diagram illustrating an example data flow in accordance with the present disclosure.
Figure 6:
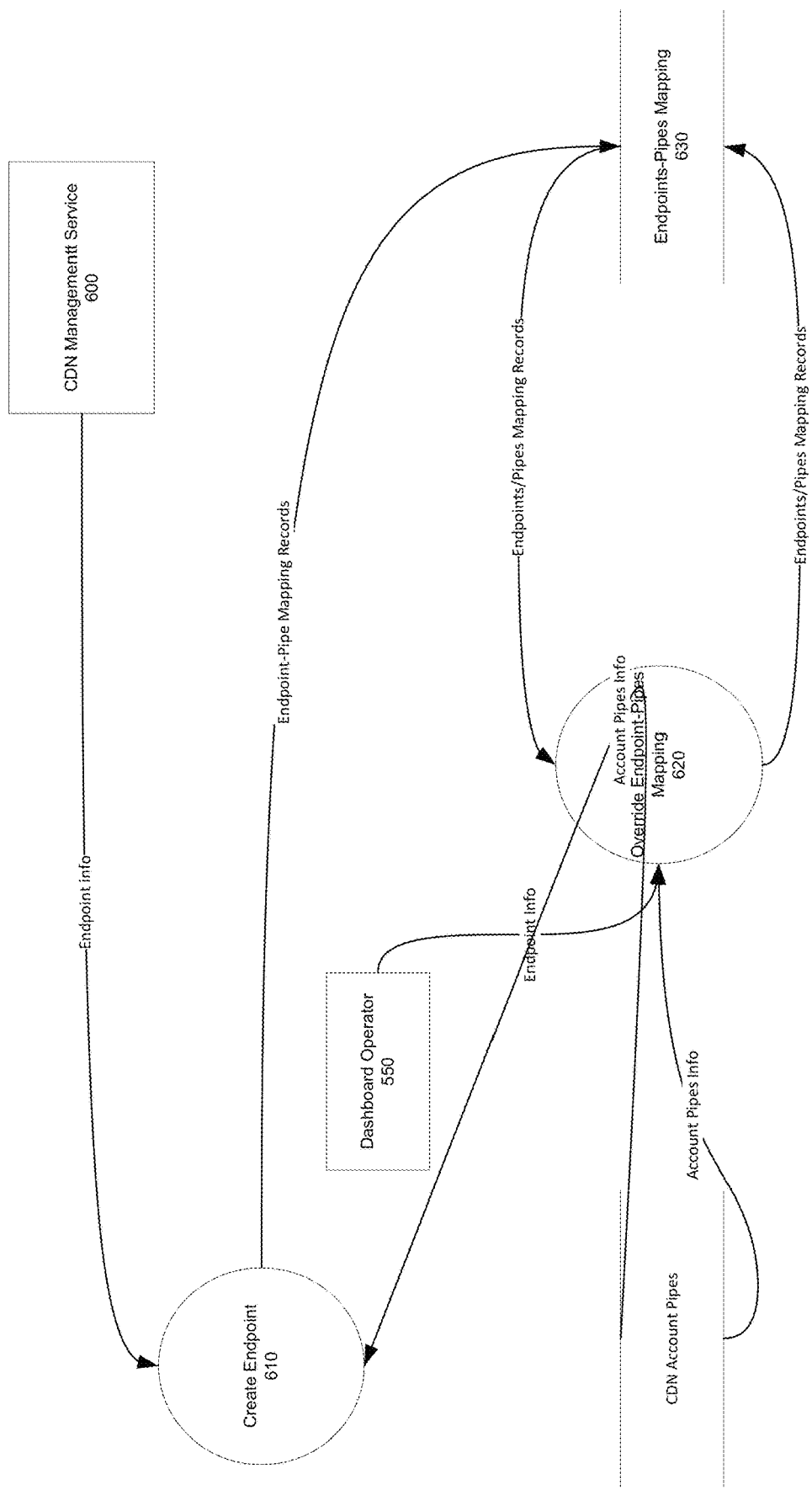
FIG. 6 is a diagram illustrating an example data flow in accordance with the present disclosure.

FIGS. 5-9 illustrates an example operational flow implementing some of the embodiments described above and how the Bayesian theoretical model integrates with a multi-CDN platform. FIG. 5 illustrates setting a provider account to internal flows. CDN provider 500 may provide account information to a local CDN 505. The provider account may be added 520 to an add CDN account pipe 530, and the CDN account pipe information may be provided to an operation dashboard 550. The default account pipe may be set 540 and the pipe mapping rules may be provided 560 to CDN management service 600 of FIG. 6 which illustrates setting customers to the pipes. Endpoint information may be provided to create an endpoint 610. Override endpoint pipes may be mapped 620 to generate a mapping 630.

Figure 7:
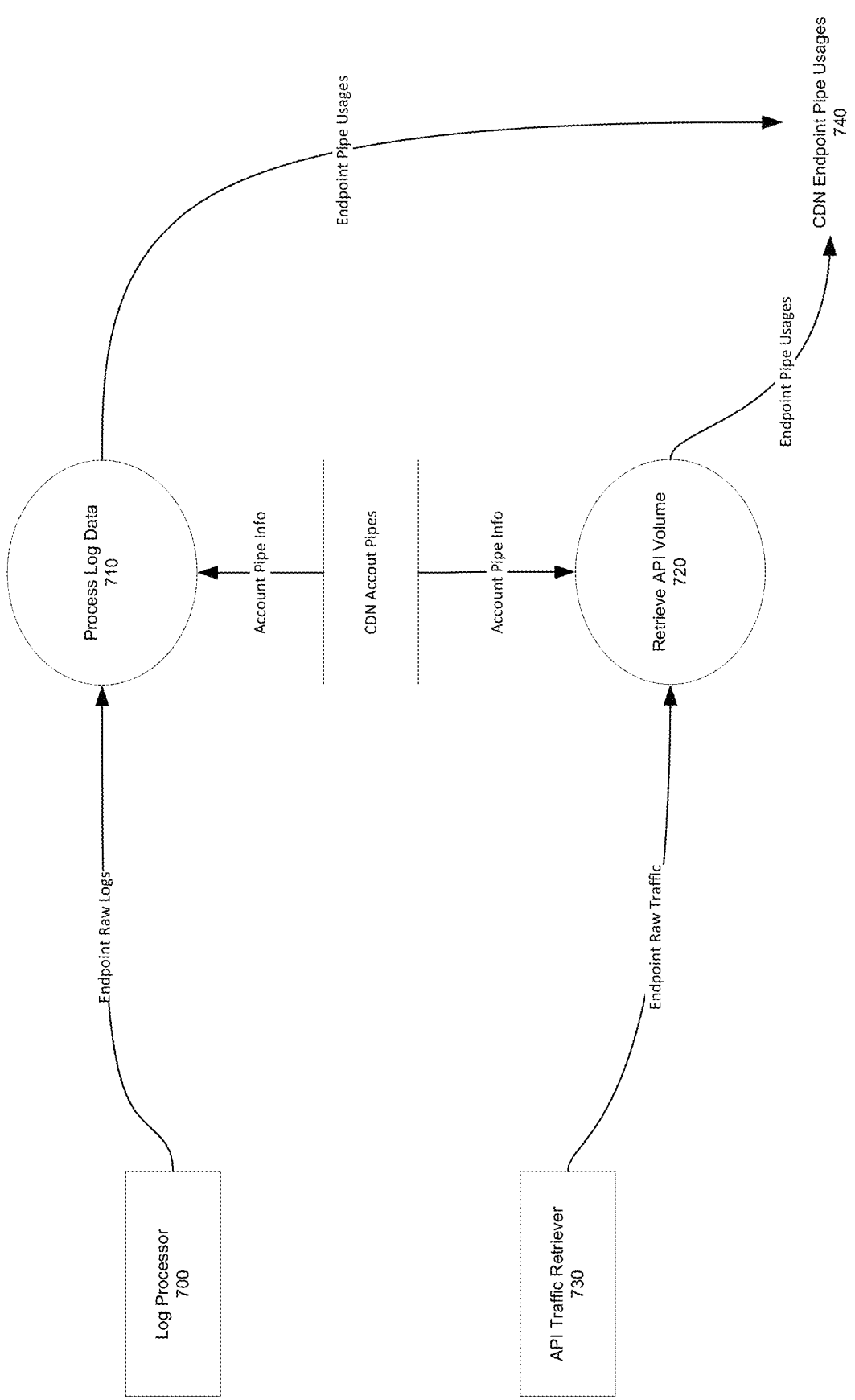
FIG. 7 is a diagram illustrating an example data flow in accordance with the present disclosure.
Figure 8:
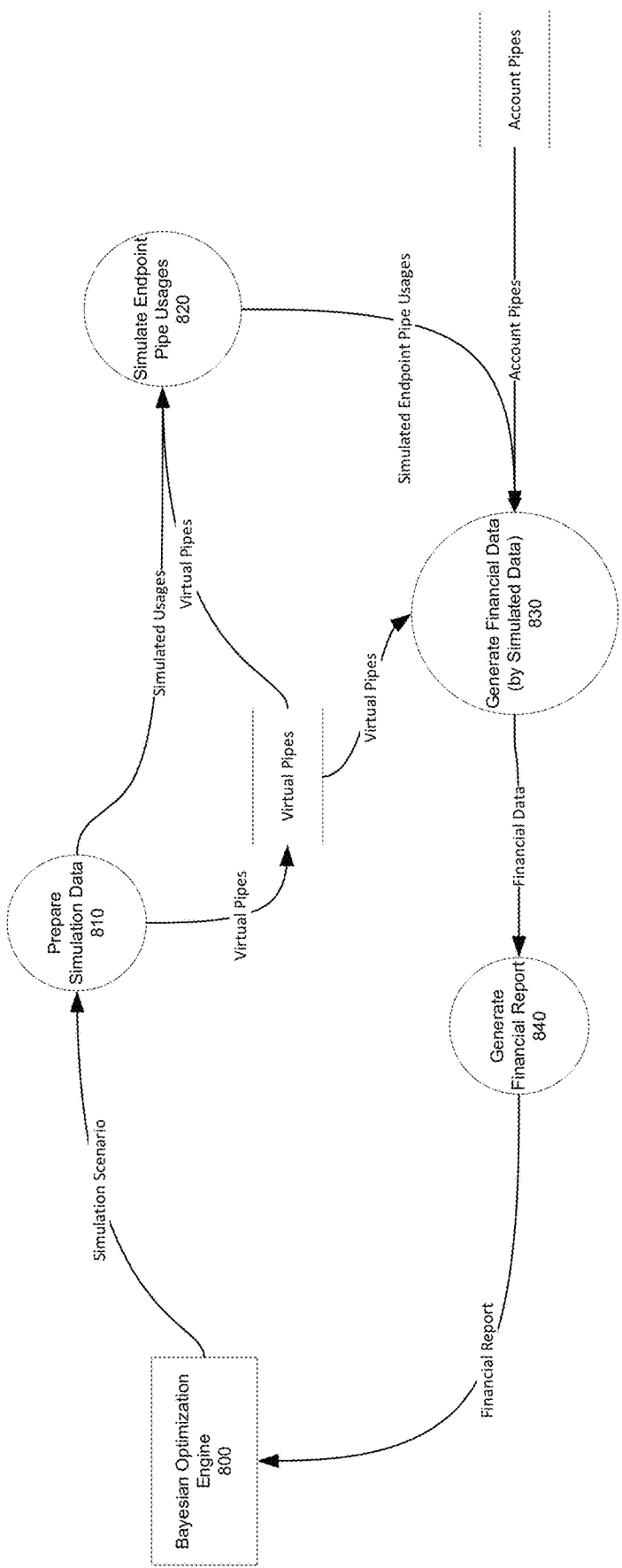
FIG. 8 is a diagram illustrating an example data flow in accordance with the present disclosure.
Figure 9:
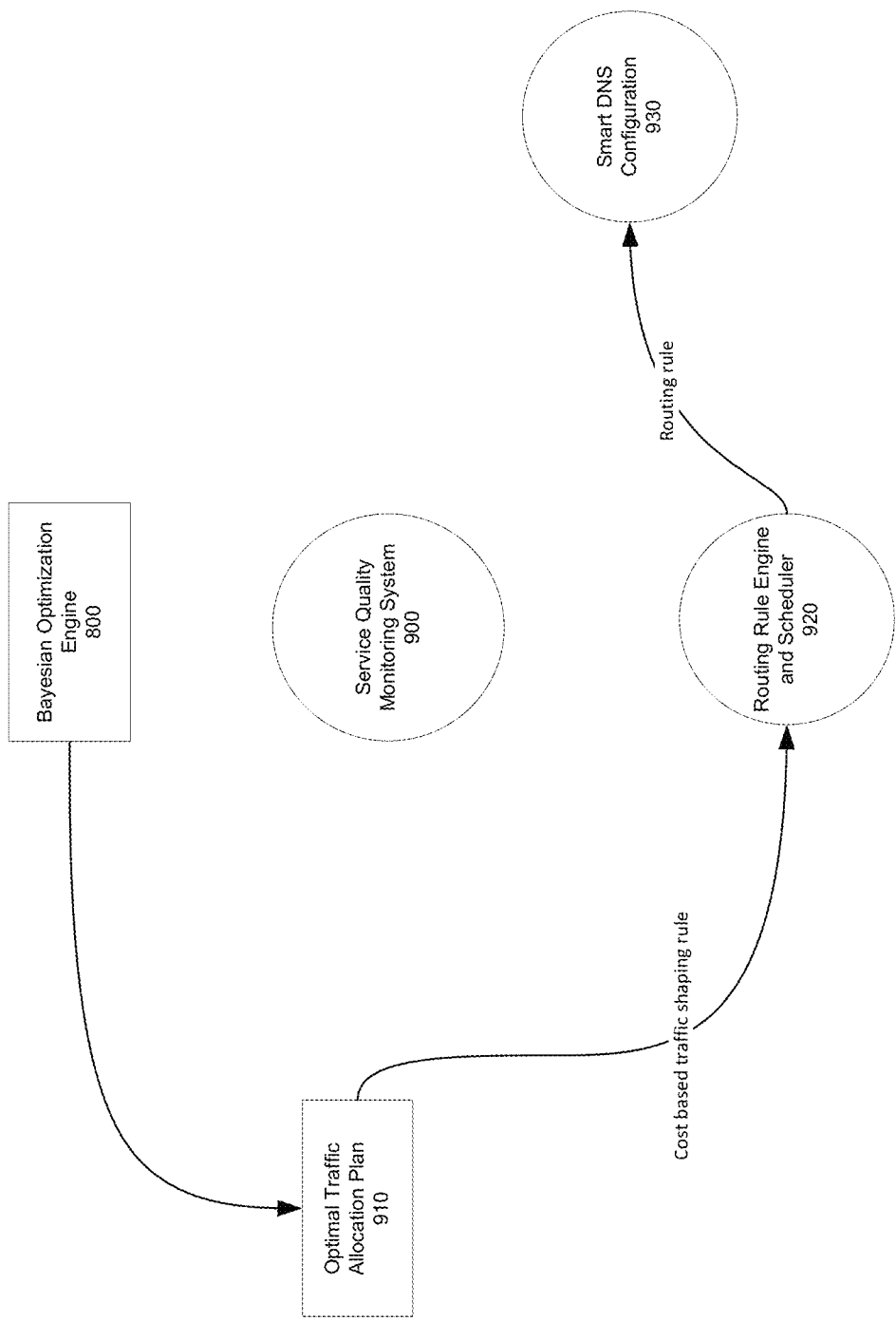
FIG. 9 is a diagram illustrating an example data flow in accordance with the present disclosure.

FIG. 7 illustrates settings customer traffic to the pipes. Log processor 700 may provide endpoint raw logs to process the log data 710. A traffic receiver API may provide endpoint raw traffic and the API volume may be retrieved 720. CDN endpoint pip usages may be generated 740. FIG. 8 illustrates optimizing the traffic pipe allocation. Bayesian optimization engine 800 provides a simulation scenario for preparing simulation data 810. Virtual pipes and simulated usages are used to simulate endpoint pipe usages 820, and the virtual pipers and simulated endpoint pipe usages are used to generate financial data 830. The financial data 830 is used to generate financial report 840. FIG. 9 illustrates pushing an optimal traffic allocation plan 910 to a smart DNS configuration 930 in one embodiment. The Bayesian optimization engine 800 may provide the optimal traffic allocation plan 910 to a routing rule engine and schedule 920. A routing rule may be provided to smart DNS configuration 930.

Figure 10:
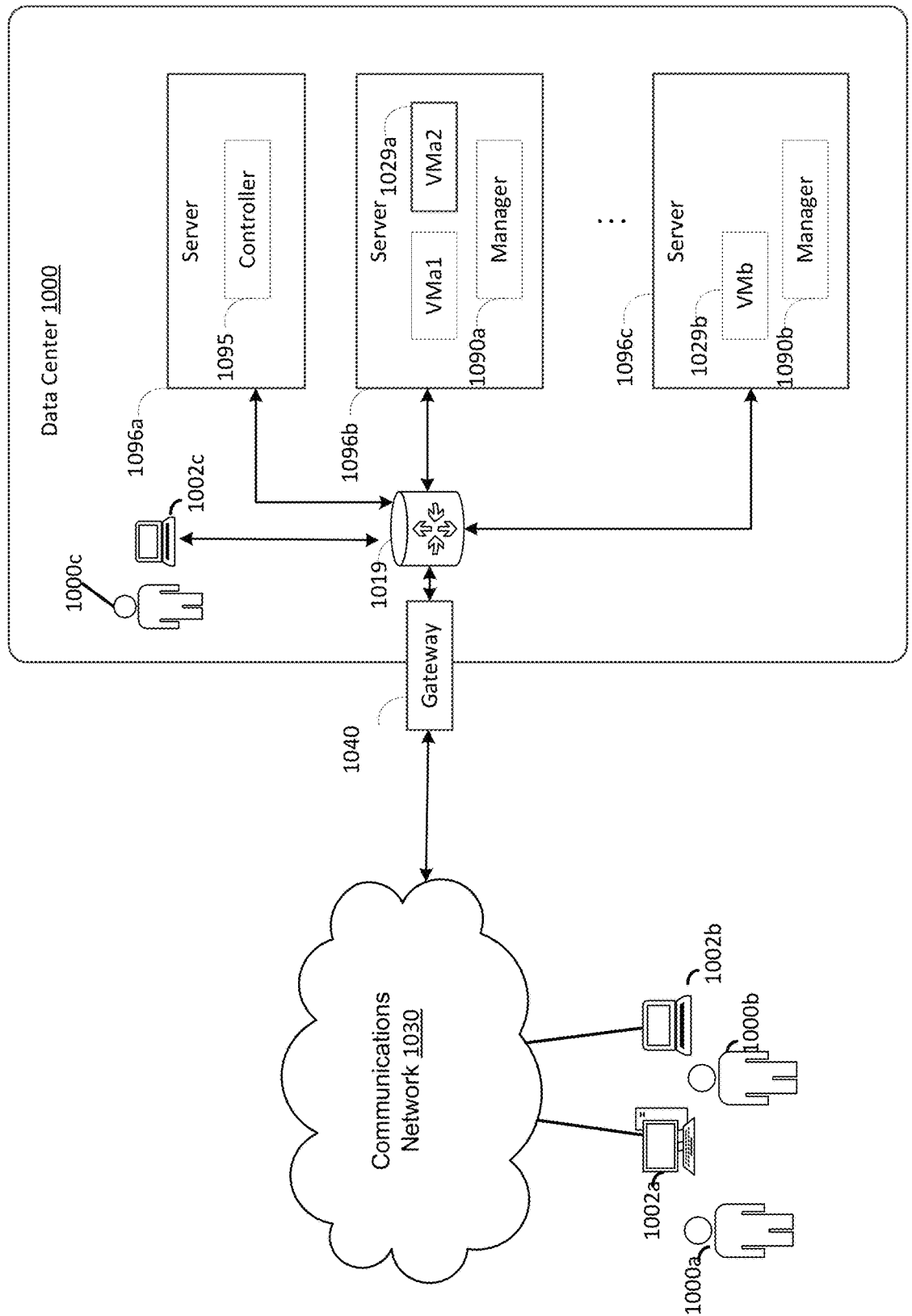
FIG. 10 is a flowchart depicting an example system in accordance with the present disclosure.

FIG. 10 illustrates an example computing environment in which the embodiments described herein may be implemented. FIG. 10 illustrates a data center 1000 that is configured to provide computing resources to users 1000a, 1000b, or 1000c (which may be referred herein singularly as "a user 1000" or in the plural as "the users 1000") via user computers 1002a, 1002b, and 1002c (which may be referred herein singularly as "a computer 1002" or in the plural as "the computers 1002") via a communications network 1030. The computing resources provided by the data center 1000 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 1000 may include servers 1096a, 1096b, and 1096c (which may be referred to herein singularly as "a server 1096" or in the plural as "the servers 1096") that provide computing resources available as virtual machines 1029a and 1029b (which may be referred to herein singularly as "a virtual machine 1029" or in the plural as "the virtual machines 1029"). The virtual machines 1029 may be configured to execute applications such as Web servers, application servers, media servers, database servers, and the like. Other resources that may be provided include data storage resources (not shown on FIG. 10) and may include file storage devices, block storage devices, and the like. Servers 1096 may also execute functions that manage and control allocation of resources in the data center, such as a controller 1095. Controller 1095 may be a fabric controller or another type of program configured to manage the allocation of virtual machines on servers 1096.

Referring to FIG. 10, communications network 1030 may, for example, be a publicly accessible network of linked networks and may be operated by various entities, such as the Internet. In other embodiments, communications network 1030 may be a private network, such as a corporate network that is wholly or partially inaccessible to the public.

Communications network 1030 may provide access to computers 1002. Computers 1002 may be computers utilized by users 1000. Computer 1002a, 1002b or 1002c may be a server, a desktop or laptop personal computer, a tablet computer, a smartphone, a set-top box, or any other computing device capable of accessing data center 1000. User computer 1002a or 1002b may connect directly to the Internet (e.g., via a cable modem). User computer 1002c may be internal to the data center 1000 and may connect directly to the resources in the data center 1000 via internal networks. Although only three user computers 1002a, 1002b, and 1002c are depicted, it should be appreciated that there may be multiple user computers.

Computers 1002 may also be utilized to configure aspects of the computing resources provided by data center 1000. For example, data center 1000 may provide a Web interface through which aspects of its operation may be configured through the use of a Web browser application program executing on user computer 1002. Alternatively, a stand-alone application program executing on user computer 1002 may be used to access an application programming interface (API) exposed by data center 1000 for performing the configuration operations.

Servers 1096 may be configured to provide the computing resources described above. One or more of the servers 1096 may be configured to execute a manager 1020a or 1020b (which may be referred herein singularly as "a manager 1020" or in the plural as "the managers 1020") configured to execute the virtual machines. The managers 1020 may be a virtual machine monitor (VMM), fabric controller, or another type of program configured to enable the execution of virtual machines 1029 on servers 1096, for example.

It should be appreciated that although the embodiments disclosed above are discussed in the context of virtual machines, other types of implementations can be utilized with the concepts and technologies disclosed herein.

In the example data center 1000 shown in FIG. 10, a network device 1029 may be utilized to interconnect the servers 1096a and 1096b. Network device 1029 may comprise one or more switches, routers, or other network devices. Network device 1029 may also be connected to gateway 1040, which is connected to communications network 1030. Network device 1029 may facilitate communications within networks in data center 1000, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 1000 described in FIG. 10 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 11:
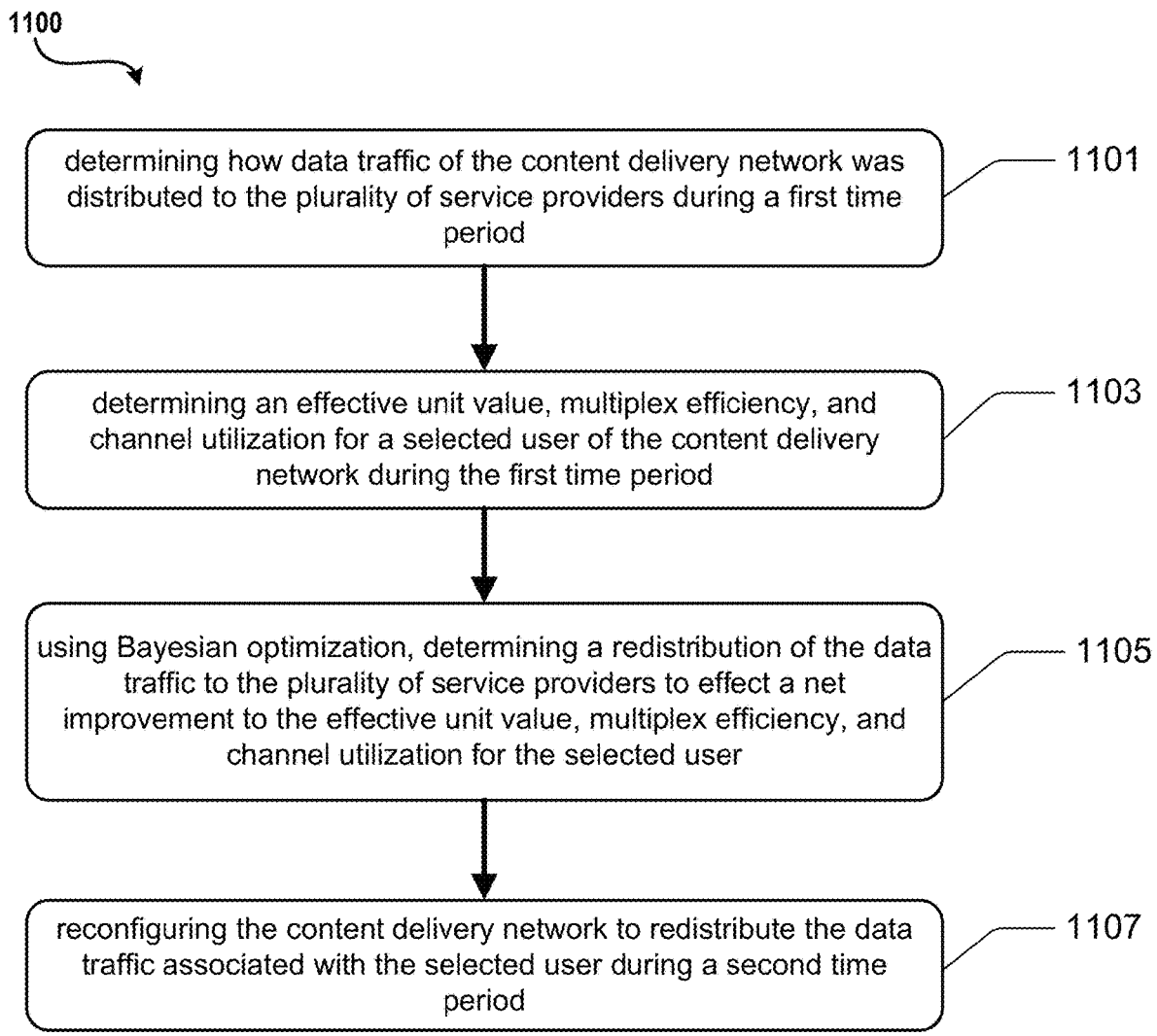
FIG. 11 is a flowchart depicting an example procedure for implementing techniques in accordance with the present disclosure.

Referring to FIG. 11, illustrated is an example operational procedure for configuring a content delivery network to provide edge services using a plurality of service providers that implement different data utilization metrics. The operational procedure may be implemented in a system comprising one or more computing devices. Referring to FIG. 11, operation 1101 illustrates determining how data traffic of the content delivery network was distributed to the plurality of service providers during a first time period.

Operation 1101 may be followed by operation 1103. Operation 1103 illustrates based on the data traffic distribution, determining an effective unit value, multiplex efficiency, and channel utilization for a selected user of the content delivery network during the first time period. In an embodiment, data traffic associated with the selected user was distributed to at least two of the plurality of service providers.

Operation 1103 may be followed by operation 1105. Operation 1105 illustrates using Bayesian optimization, determining a redistribution of the data traffic to the plurality of service providers to effect a net improvement to the effective unit value, multiplex efficiency, and channel utilization for the selected user.

Operation 1105 may be followed by operation 1107. Operation 1107 illustrates based on the determined redistribution, reconfiguring the content delivery network to redistribute the data traffic associated with the selected user during a second time period.

In an embodiment, the content delivery network is iteratively reconfigured based on data distribution for the selected user during subsequent time periods In an embodiment, the effective unit cost is determined based on a total cost and total data traffic.

In an embodiment, based on the accessed data, a channel quality may be determined.

In an embodiment, the total cost is determined based on billed bandwidth and a billing rate.

In an embodiment, the multiplex efficiency is determined based on a total bandwidth requirement wherein the user data traffic uses separate instances of a traffic channel divided by a combined total bandwidth requirement wherein the user data traffic is combined and share a single instance of the traffic channel.

In an embodiment, bandwidth utilization is calculated based on an actual total traffic incurred in a month divided by a total traffic volume paid to an underlying service provider and available for use.

In an embodiment, reconfiguring the content delivery network comprises using a smart routing engine to implement the redistribution.

In an embodiment, the method further comprises applying a Metropolis-Hastings framework to the Bayesian optimization.

In an embodiment, the method further comprises constructing a Markov chain with a stationary distribution.

In an embodiment, multiple candidates are proposed simultaneously and a candidate with the highest f(θ) value is evaluated.

In an embodiment, the method further comprises applying Adoptive Rejection Sampling (ARS) using a sequence of sampling distributions defined by a piecewise linear function.

In an embodiment, the method further comprises using an envelop function as a proposal function.

In further embodiments, a system comprises:
at least one memory having stored therein computer instructions that, upon execution by one or more processors of the system, at least cause the system to:
determine one or more of an effective unit cost, multiplex efficiency, and channel utilization for a selected user of a content delivery network configured to provide edge services using a plurality of service providers, wherein data traffic for the selected user of the content delivery network was distributed to at least two of the plurality of service providers;
apply a Bayesian optimization algorithm to optimize the one or more of the effective unit cost, multiplex efficiency, and channel utilization;
based on the applying, determine a redistribution of the data traffic to the plurality of service providers to effect a net improvement to the one or more of effective unit value, multiplex efficiency, and channel utilization for the selected user; and
based on the determined redistribution, configure the content delivery network to redistribute data traffic for the selected user.

The system further comprises computer instructions that, upon execution by one or more processors of the system, at least cause the system to:
apply a Metropolis-Hastings framework to the Bayesian optimization algorithm; and
construct a Markov chain with a stationary distribution.

The system further comprises computer instructions that, upon execution by one or more processors of the system, at least cause the system to apply Adoptive Rejection Sampling (ARS) using a sequence of sampling distributions defined by a piecewise linear function.

In an embodiment, multiple candidates are proposed simultaneously and a candidate with the highest f(θ) value is evaluated.

In another embodiment, a computer-readable storage medium has computer-executable instructions stored thereupon which, when executed by one or more processors of a computing device, cause the computing device to perform operations comprising:
determining data comprising one or more of an effective unit cost, multiplex efficiency, and channel utilization for a selected user of a content delivery network configured to provide edge services using a plurality of service providers, wherein data traffic for the selected user of the content delivery network was distributed to at least two of the plurality of service providers;
applying a Bayesian optimization algorithm to at least a portion of the determined data to determine a redistribution of the data traffic to the plurality of service providers to effect a net improvement to the effective unit value, multiplex efficiency, or channel utilization for the selected user; and
based on the determined redistribution, reconfiguring the content delivery network to redistribute data traffic for the selected user.

In an embodiment, configuring the content delivery network comprises configuring a smart routing engine to implement the redistribution.

In an embodiment, the computer-readable storage medium further comprises computer-executable instructions stored thereupon which, when executed by one or more processors of a computing device, cause the computing device to perform operations comprising applying Adoptive Rejection Sampling (ARS) using a sequence of sampling distributions defined by a piecewise linear function.

In an embodiment, the computer-readable storage medium further comprises computer-executable instructions stored thereupon which, when executed by one or more processors of a computing device, cause the computing device to perform operations comprising:
applying a Metropolis-Hastings framework to the portion of data; and
constructing a Markov chain with a stationary distribution The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 12:
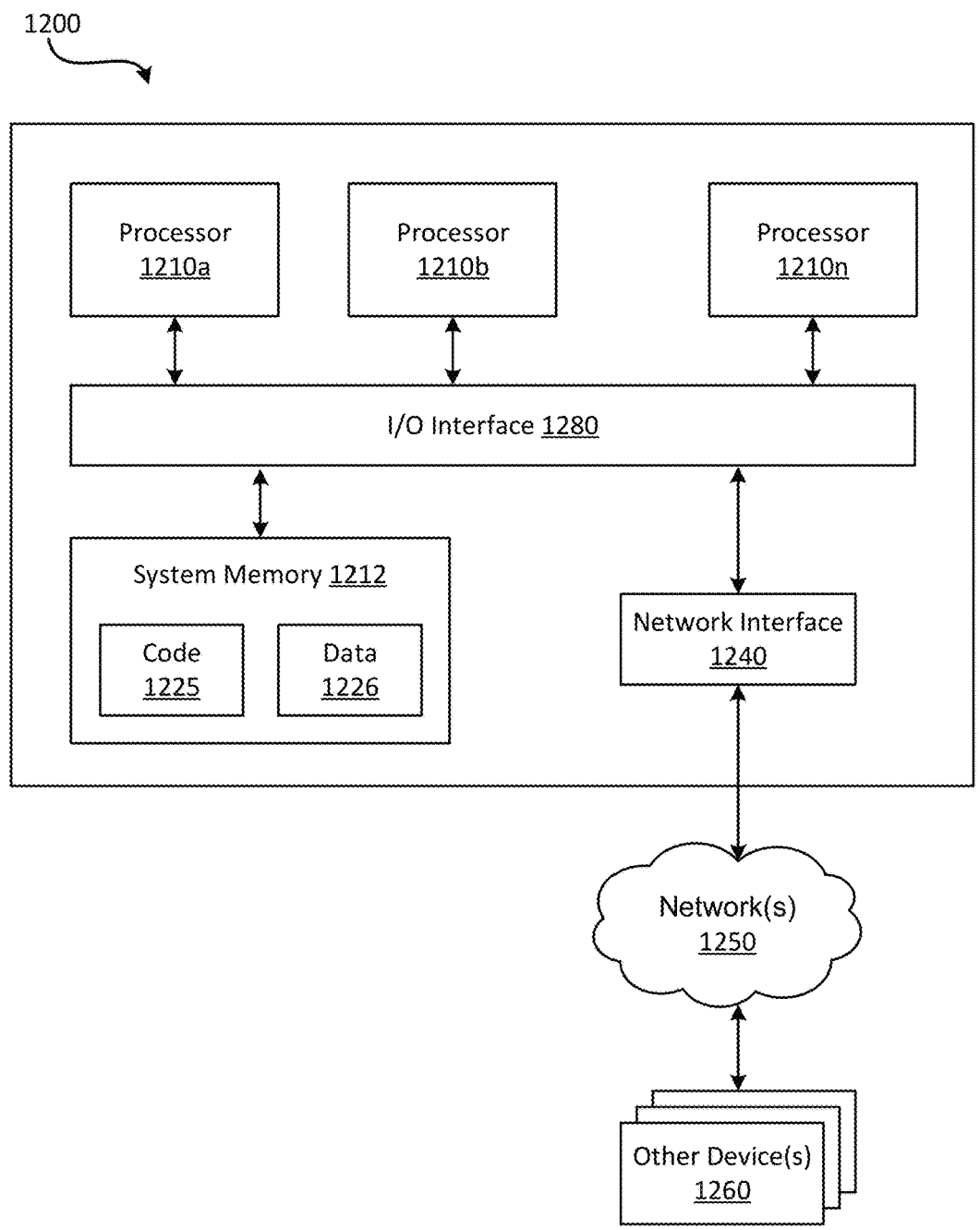
FIG. 12 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 12 illustrates such a general-purpose computing device 1200. In the illustrated embodiment, computing device 1200 includes one or more processors 1210*a*, 1210*b*, and/or 1210*n* (which may be referred herein singularly as "a processor 1210" or in the plural as "the processors 1210") coupled to a system memory 1212 via an input/output (I/O) interface 1230.

Computing device 1200 further includes a network interface 1240 coupled to I/O interface 1230.

In various embodiments, computing device 1200 may be a uniprocessor system including one processor 1210 or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x126, PowerPC, SPARC, or MIPS ISAs, or any other suitable ISA. In multiprocessor systems, each of processors 1210 may commonly, but not necessarily, implement the same ISA.

System memory 1212 may be configured to store instructions and data accessible by processor(s) 1210. In various embodiments, system memory 1212 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1212 as code 1225 and data 1226.

In one embodiment, I/O interface 1230 may be configured to coordinate I/O traffic between the processor 1210, system memory 1212, and any peripheral devices in the device, including network interface 1240 or other peripheral interfaces. In some embodiments, I/O interface 1230 may perform any necessary protocol, timing, or other data transformations to convert data signals from one component (e.g., system memory 1212) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components. Also, in some embodiments some or all of the functionality of I/O interface 1230, such as an interface to system memory 1212, may be incorporated directly into processor 1210.

Network interface 1240 may be configured to allow data to be exchanged between computing device 1200 and other device or devices 1260 attached to a network or network(s) 1250, such as other computer systems or devices as illustrated in FIGS. 1 through 4, for example. In various embodiments, network interface 1240 may support communication via any suitable wired or wireless general data networks, such as types of Ethernet networks, for example. Additionally, network interface 1240 may support communication via telecommunications/telephony networks such as analog voice networks or digital fiber communications networks, via storage area networks such as Fibre Channel SANs or via any other suitable type of network and/or protocol.

In some embodiments, system memory 1212 may be one embodiment of a computer-accessible medium configured to store program instructions and data as described above for FIGS. 1-12 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1200 via I/O interface 1230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1200 as system memory 1212 or another type of memory. Further, a computer-accessible medium may include transmission media or signals such as electrical, electromagnetic or digital signals, conveyed via a communication medium such as a network and/or a wireless link, such as may be implemented via network interface 1240. Portions or all of multiple computing devices, such as those illustrated in FIG. 12, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 12, may include other components that are not explicitly shown in FIG. 12, or may utilize an architecture completely different than that shown in FIG. 12.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for configuring a content delivery network to provide edge services using a plurality of service providers that implement different data utilization metrics, the method comprising:
   determining how data traffic of the content delivery network was distributed to the plurality of service providers during a first time period;
   based on the data traffic distribution, determining one or more of an effective unit value, multiplex efficiency, or channel utilization for a selected user of the content delivery network during the first time period, wherein data traffic associated with the selected user was distributed to at least two of the plurality of service providers;
   determining a redistribution of the data traffic to the plurality of service providers to effect a net improvement to the one or more of the effective unit cost, multiplex efficiency, or channel utilization for the selected user; and
   based on the determined redistribution, reconfiguring the content delivery network to redistribute the data traffic associated with the selected user during a second time period.

2. The method according to claim 1, further comprising iteratively reconfiguring the content delivery network based on data distribution for the selected user during subsequent time periods.

3. The method according to claim 1, wherein the effective unit cost is determined based on a total cost and total data traffic.

4. The method according to claim 3, wherein the total cost is determined based on billed bandwidth and a billing rate.

5. The method according to claim 1, wherein the multiplex efficiency is determined based on a total bandwidth requirement wherein the data traffic uses separate instances of a traffic channel divided by a combined total bandwidth requirement wherein the data traffic is combined and share a single instance of the traffic channel.

6. The method according to claim 1, wherein bandwidth utilization is calculated based on an actual total traffic incurred in a month divided by a total traffic volume paid to an underlying service provider and available for use.

7. The method according to claim 1, wherein reconfiguring the content delivery network comprises using a smart routing engine to implement the redistribution.

8. The method according to claim 1, wherein the determining the redistribution of the data traffic is performed using Bayesian optimization, further comprising applying a Metropolis-Hastings framework to the Bayesian optimization.

9. The method according to claim 8, further comprising constructing a Markov chain with a stationary distribution.

10. The method according to claim 9, wherein multiple candidates are proposed simultaneously and a candidate with a highest $f(\theta)$ value is evaluated.

11. The method according to claim 1, further comprising applying Adoptive Rejection Sampling (ARS) using a sequence of sampling distributions defined by a piecewise linear function.

12. The method according to claim 9 further comprising using an envelope function as a proposal function.

13. A system comprising:
    at least one memory having stored therein computer instructions that, upon execution by one or more processors of the system, at least cause the system to:
    determine one or more of an effective unit cost, multiplex efficiency, or channel utilization for a selected user of a content delivery network configured to provide edge services using a plurality of service providers, wherein data traffic for the selected user of the content delivery network was distributed to at least two of the plurality of service providers;
    determine a redistribution of the data traffic to the plurality of service providers to effect a net improvement to the one or more of effective unit cost, multiplex efficiency, or channel utilization for the selected user; and
    based on the determined redistribution, configure the content delivery network to redistribute data traffic for the selected user.

14. The system of claim 13, further comprising computer instructions that, upon execution by one or more processors of the system, at least cause the system to:
    apply a Bayesian optimization algorithm to optimize the one or more of the effective unit cost, multiplex efficiency, or channel utilization;
    apply a Metropolis-Hastings framework to the Bayesian optimization algorithm; and
    construct a Markov chain with a stationary distribution.

15. The system of claim 13, further comprising computer instructions that, upon execution by one or more processors of the system, at least cause the system to apply Adoptive Rejection Sampling (ARS) using a sequence of sampling distributions defined by a piecewise linear function.

16. The system of claim 14, wherein multiple candidates are proposed simultaneously and a candidate with a highest $f(\theta)$ value is evaluated.

17. A computer-readable storage medium having computer-executable instructions stored thereupon which, when executed by one or more processors of a computing device, cause the computing device to perform operations comprising:
    determining data comprising one or more of an effective unit cost, multiplex efficiency, or channel utilization for a selected user of a content delivery network configured to provide edge services using a plurality of service providers, wherein data traffic for the selected user of the content delivery network was distributed to at least two of the plurality of service providers;
    determine a redistribution of the data traffic to the plurality of service providers to effect a net improvement to the one or more of the effective unit cost, multiplex efficiency, or channel utilization for the selected user; and
    based on the determined redistribution, reconfiguring the content delivery network to redistribute data traffic for the selected user.

18. The computer-readable storage medium of claim 17, wherein configuring the content delivery network comprises configuring a smart routing engine to implement the redistribution.

19. The computer-readable storage medium of claim 17, further comprising computer-executable instructions stored thereupon which, when executed by one or more processors of a computing device, cause the computing device to perform operations comprising applying Adoptive Rejection Sampling (ARS) using a sequence of sampling distributions defined by a piecewise linear function.

20. The computer-readable storage medium of claim 17, further comprising computer-executable instructions stored thereupon which, when executed by one or more processors of a computing device, cause the computing device to perform operations comprising:
    applying a Metropolis-Hastings framework to a portion of the data; and
    constructing a Markov chain with a stationary distribution.

* * * * *